United States Patent [19]

Torterotot

[11] Patent Number: 5,309,955
[45] Date of Patent: May 10, 1994

[54] PROCESS AND DEVICE FOR ADJUSTING THE QUANTITIES OF PRODUCT DOSED AND DISPENSED BY A DOSER-DISPENSER

[75] Inventor: Roland Torterotot, Longvilliers, France

[73] Assignee: Erca Holding, Cedex, France

[21] Appl. No.: 844,671

[22] PCT Filed: Jul. 25, 1991

[86] PCT No.: PCT/FR91/00614
§ 371 Date: May 5, 1992
§ 102(e) Date: May 5, 1992

[87] PCT Pub. No.: WO92/02414
PCT Pub. Date: Feb. 20, 1992

[30] Foreign Application Priority Data

Aug. 8, 1990 [FR] France ............... 90 10143

[51] Int. Cl.[5] .................................... B65B 1/04
[52] U.S. Cl. ............................... 141/1; 141/83; 141/266
[58] Field of Search ............ 141/1, 83, 147, 156, 141/183, 188, 258, 260, 266, 5, 177, 192

[56] References Cited

U.S. PATENT DOCUMENTS

| | | | |
|---|---|---|---|
| 3,744,538 | 7/1973 | Nasica et al. | 141/242 |
| 4,164,244 | 8/1979 | Meier | 141/156 |
| 4,467,844 | 8/1984 | Di Gianfilippo et al. | 141/83 |
| 4,767,031 | 8/1988 | Proepper | 141/261 |
| 4,917,158 | 4/1990 | Lingenhoff | 141/261 |
| 5,027,983 | 7/1991 | Wakabayashi et al. | 141/258 |
| 5,145,009 | 9/1992 | Mheidle et al. | 141/83 |

FOREIGN PATENT DOCUMENTS

| | | |
|---|---|---|
| 3510110 | 2/1986 | Fed. Rep. of Germany . |
| 2067983 | 8/1971 | France . |
| 336312 | 11/1954 | Switzerland . |

OTHER PUBLICATIONS

Search Report for PCT/FR91/00614.

Primary Examiner—Henry J. Recla
Assistant Examiner—David J. Walezak
Attorney, Agent, or Firm—Ladas & Parry

[57] ABSTRACT

A process for adjusting the quantities of a liquid or paste food or pharmaceutical product dosed and dispensed by a doser-dispenser (20) in which the weight of at least every nth one of the recipients (101) filled by the same doser-dispenser (20) with a dosed quantity of the product (102) is measured, the number n being an integer between 1 and 1000. Each weight value measured is compared with a predetermined standard value and at least one of the end-of-stroke positions of the doser piston of the doser-dispenser (20) is adjusted step by step and during the operation of the doser-dispenser (20), in the sense of increasing or decreasing the stroke of the doser piston when the difference between the actual weight measured and the difference between the actual weight measured and the predetermined standard weight exceeds a limiting value. The adjustment is continued stepwise until the difference disappears.

24 Claims, 1 Drawing Sheet

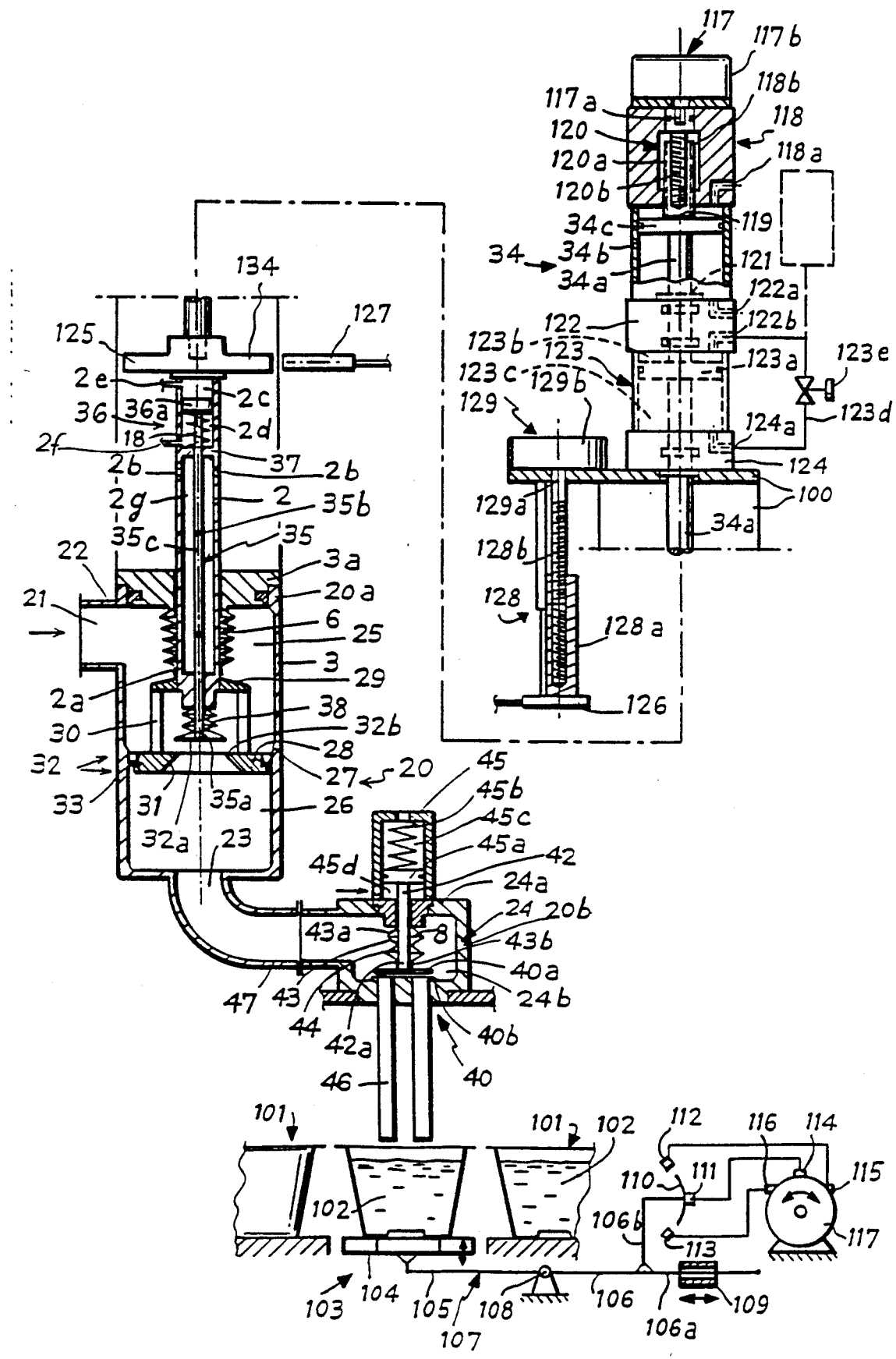

PROCESS AND DEVICE FOR ADJUSTING THE QUANTITIES OF PRODUCT DOSED AND DISPENSED BY A DOSER-DISPENSER

The present invention relates to a process and a device for adjusting the quantities of product dosed and dispensed by a doser-dispenser, for foodstuffs or pharmaceuticals, the product preferably being in a liquid and/or pasty state.

FIELD OF THE INVENTION

The present invention is particularly applied to a doser-dispenser of the type comprising, in a first cylindrical enclosure, on the one hand, an upper supply chamber connected by a supply conduit to a first reservoir for storing the product and, on the other hand, a lower dosing chamber, a doser-piston which slides tightly in said first enclosure and separates said supply chamber from said dosing chamber and which comprises a central passage constituting the seat for an obturation flap of an admission valve opening in the direction of the supply chamber, a first control tube penetrating tightly into said first enclosure in which it is fixed to the doser-piston and outside which it is fixed to the piston of a first control jack whose cylinder is mounted on a support of said first enclosure, the doser-dispenser further comprising a second control tube whose lower end part penetrates tightly in said first enclosure, is guided in said first control tube and is fast, at its upper end, with a piston of a second control jack incorporated in said first control tube, as well as a dispensing chamber connected, on the one hand, to the outlet of the dosing chamber and, on the other hand, to an ejection pipe adapted to be obturated by the flap of an ejection valve.

BACKGROUND AND PRIOR ART

This type of doser-dispenser is described in Patent Application FR 89 06316 of 12.5.1989 and in Patent Application EP 90401252 of 15.5.1990 to which reference may be made for greater details.

In an installation for packing a liquid and/or pasty product in receptacles or recipients made by thermoforming a thermoplastic web, a plurality of juxtaposed doser-dispensers are used, in a row extending transversely with respect to the direction of advance of the thermoplastic web containing successive transverse rows of recipients parallel to that of that of the row of doser-dispensers and advancing step by step with the web in the direction of advance thereof.

These doser-dispensers are, like others (cf. for example French Patent 2 067 983), volumetric dosers which dispense determined quantities of product for a given product density. It frequently happens that the density of the product varies locally by some percent, with the result that the weight of the quantities of product dosed volumetrically and dispensed in the corresponding recipients differs beyond the allowed limits from the theoretical weight inscribed on said recipients. In order to eliminate the most important differences in weight, a filled recipient is weighed at regular intervals and its weight is compared with a standard recipient. When the difference in weight thus ascertained exceeds a limiting value, the stroke of the doser piston of each of the doserdispensers is readjusted as a function of the difference in weight. Such readjustment obviously requires that the whole installation be stopped, resulting in a loss of productivity.

In another installation disclosed in German Patent 3 510 110, the quantity dosed by the doser is checked from time to time, by diverting the dosed quantity from its normal discharge into a packaging recipient to a standard recipient disposed on precision scales whole output signal corresponding to the measured weight of said deviated dosed quantity is sent to the input of a computer such as a micro-processor. The signal corresponding to the measured weight of the dosed quantity is compared in this computer with a standard signal corresponding to a given weight. If there is a difference between the two signals, the computer emits a correction signal to modify the stroke of the piston of the doser in the sense of bringing the octal weight of the dosed quantity closer to the standard weight. During the process, the packaging recipients are not filled and transport of the recipients and actuation of all the other elements of the packing installation are stopped.

An object of the invention consists in eliminating or at least attenuating the drawbacks set forth and in proposing a doser-dispenser of the type initially mentioned, which does not require any stoppage of the installation for readjusting the quantities dosed by each of the doser-dispensers.

SUMMARY OF THE INVENTION

This object is attained by the fact that the doser piston or one of the members moving therewith during its ascending and descending strokes corresponding respectively to the admission of a determined quantity of product in the dosing chamber and to the delivery of this quantity from said dosing chamber towards the ejection pipe, is associated with two end-of-stroke stops each of which determines one of the two end-of-stroke ends, and at least one of which is of the type being an adjustable position during operation of the doser-dispenser and of the installation which is a function of the difference existing between the measured weight of a dosed and dispensed quantity of product, and a predetermined standard weight.

The adjustable stop is advantageously connected, via a spindle and nut transmission, to the driven shaft of a step-by-step motor controlled as a function of the difference between the actual weight measured and the predetermined standard weight of a filled recipient or of a group of recipients filled with the product.

Thanks to this design, the volume of product dosed during the ascending stroke and then delivered and dispensed during the descending stroke of the doser-piston may be modified by remote-control as a function of needs and without stopping the packing intallation, by sending control pulses to the step-by-step motor of the doser-dispenser concerned. Another advantage of the invention lies in the fact that the volume of each doser-dispenser may be adjusted independently of that of the other doser-dispensers and at different instants for each of said doser-dispensers. The adjusting device according to the invention further makes it possible easily to correct the manufacturing inaccuracies, particularly those of the bore of the dosing chamber.

The invention also relates to a process for adjusting the quantities of product dosed and dispensed by a doser-dispenser of the type mentioned hereinabove, this process being characterized in that the weight of at least every nth recipient filled by the same doser-dispenser is measured, the whole number n varying between 1 and 1000, each weight value measured is compared with a predetermined standard value and at least one of the end-of-stroke positions of the doser piston of said doser-dispenser is adjusted step-by-step, and during operation of the doser-dispenser, in the sense of increasing or decreasing the piston stroke as soon as the difference between the actual weight measured and the standard weight exceeds a limiting value, and such adjustment is continued until said difference disappears.

Thanks to this process, the weight of the product dispensed in each recipient remains virtually constant with, at most, extremely slight differences, always below the tolerated limits.

The invention will be more readily understood with the aid of the following description of several embodiments, said description being made with reference to the drawing in which:

BRIEF DESCRIPTION OF THE DRAWING

The single Figure shows a schematic view in elevation of a vertical axial section through a doser-dispenser according to the invention.

As shown in the drawing, the doser-dispenser 20 comprises a first enclosure 3, sterile if necessary, which, in the upper end part, comprises a lateral opening 21 permanently connected by a supply conduit 22 to a first storage reservoir (not shown) containing a first pasty or pressurized-liquid, food or pharmaceutical product. The bottom of enclosure 3 presents an outlet opening 23 which is permanently connected, in the case shown, to a second enclosure 24, likewise sterile if necessary.

DETAILED DESCRIPTION OF PREFERRED EMBODIMENTS

The first enclosure 3 constitutes the dosing part 20a of the doser-dispenser 20 and the second enclosure 24 constitutes the dispensing part 20b of said doser-dispenser 20. The first enclosure 3 presents a cylindrical configuration and comprises, from top to bottom, an upper supply chamber 25 permanently connected to the supply conduit 22 and through the latter to the first storage reservoir, and a lower dosing chamber 26 which may present a diameter slightly smaller than that of the supply chamber 25. The lower end of the supply chamber 25 is connected to the upper end of the dosing chamber 26 by a truncated annular necking 27 narrowing downwardly in the direction of the dosing chamber 26. A doser piston 28 is movably mounted in the dosing chamber 26 and may slide tightly therein between a lower, so-called delivery position, and an upper, so-called suction position, in which it is located, if necessary, just below the truncated necking 27 and separates the supply chamber 25 from the dosing chamber 26. However, the upper position of the doser piston 28, in the same way as the lower position thereof, may vary as a function of the quantity of product to be dosed for each stroke of said doser piston as it travels from its upper position to its lower position. Of course, with a view to cleaning and sterilization, the doser piston 28 may be placed in a higher position than the normal upper position. The doser piston 28 is fixed to the lower end part of the section 2a of a first control tube 2 via a transverse flange having the form of a circular or truncated disc 29 and a plurality of spacer rods 30 extending parallel to the axis of the first control tube 2 between the periphery of the flange 29 fast with said first tube 2 and that of the doser-piston 28. The piston 28 has a central passage 31 adapted to be obturated by the flap 32a of an admission valve 32. The doser piston 28 comprises on its periphery an O-ring 33. The spacer rods 30 are fixed, on the one hand, to the periphery of the circular flange 29 and, on the other hand, to the doser-piston 28 between the O-ring 33 and the central passage 31 of the latter.

The first control tube 2 traverses the upper wall 3a of the enclosure 3 and is guided therein axially during its alternately ascending and descending movements controlled by a double-acting pneumatic jack 34. The upper end of the first control tube 2 is therefore fixed to the piston rod 34a of the pneumatic jack 34 whose cylinder 34b is permanently installed on the support frame 100. The connection between the lower end of the rod 34a of the piston 34c of the jack 34 and the upper end of the first control tube 2 is effected by any appropriate means such as a connecting flange 134 fixed, on the one hand, to the rod 34a of the piston 34c and, on the other hand, to the upper end of the first control tube 2. The lower end of the first control tube 2 is obturated tightly with respect to the interior of the enclosure 3. The first control tube 2 is surrounded, on its section 2a penetrating in the enclosure 3, by a first bellows 6 of which the upper end is fixed tightly on the enclosure wall 3a traversed by said first tube 2, and whose lower end is fixed tightly on the lower end part of said first tube 2. Each annular fold of the bellows 6 is associated with a rigidifying washer 8 inside said bellows 6, these washers being capable of sliding along the first tube 2, and the annular space between the first bellows 6 and the first control tube 2 being permanently connected to the outside atmosphere.

The flap 32a of the admission valve 32 is disposed, with respect to the doser-piston 28, on the supply chamber 25 side, at least when said doser piston 28 occupies its upper position in the vicinity of the truncated necking 27, the upper edge of the central passage 31 in the doser-piston 28 constituting the valve seat 32b of said admission valve 32. The central passage 31 of the doser piston 28 presents a truncated form which widens from the supply chamber 25 towards the dosing chamber 26. The admission flap 32a of the admission valve 32 is disposed in the enclosure 3 between the lower end of the first control tube 2 in the vicinity thereof, and the central passage 31 of the doser-piston 28 which is spaced apart by a determined distance from the lower end of said first tube 2 whilst being fixed thereon. Thanks to this arrangement, the admission flap 32a may effect its opening and closing movements between the upper face of the doser piston 28 and the lower end of the first control tube 2. In addition, this admission flap 32a is borne by the closed lower end of a second control tube 35 guided in the first control tube 2 and projecting beyond the lower end thereof below the circular or truncated flange 29. At its upper end, the second control tube 35 bears a piston 36a of a second control jack 36 incorporated in the first control tube 2. This piston 36a slides tightly in the upper end part of the first control tube 2 and separates the interior of said upper end part into an upper chamber 2c and a lower chamber 2d which, at its lower end, is defined by a transverse annular partition 37 fast with the first control tube 2 and tightly guiding the upper end part of the second control tube 35. The upper chamber 2c may be connected through a lateral bore 2e and a control valve (not shown) either to the atmosphere, or to a source of compressed air. The lower chamber 2d is permanently connected to the atmosphere through at least one transverse orifice in the tube 2. A return spring 18 in chamber 2d surrounds the upper part of the second control tube 35, and abuts on the one hand, on the control piston 36a and, on the other hand, on the partition 37. The return spring 18 acts via the piston 36a and the second tube 35 in the sense of opening the admission valve 32 and always against the pressure which may be established in the upper chamber 2c and which provokes and ensures closure of said valve 32. This arrangement is particularly advantageous when it is desired to obtain a rapid, virtually instantaneous closure of the admission valve 32. The lower end part 35a of the second control tube 35, which projects beyond the lower end of the first control tube 2, is surrounded by a second bellows 38 whose structure is identical or similar to that of the preceding bellows 6 and each of whose annular folds also comprises a rigidifying washer 8 capable of sliding along the second control tube 35. The upper end of the second bellows 38 is tightly fixed to the lower end of the first control tube 2 or an element fast therewith below the flange 29 and the first bellows 6, and the lower end of said second bellows 38 is fixed tightly either to the lower end of said second control tube 38, or to the admission flap 32a fast with said second tube 35. In this way, the lower end of the first control tube 2 is obturated tightly with respect to the interior of the enclosure 3. The annular space between the lower end part 35a of the second control tube 35 and the second bellows 38 is permanently connected to the outer atmosphere, for example with the aid of a plurality of passages made in the form of short slots or circular orifices 35b in the lower end part 35a of the second tube 35 and in the tube section 35c remaining inside the space 2g of the first tube 2 below the transverse annular partition 37, the space 2g being connected to the atmosphere through one or more orifices 2b in the wall of the first tube 2 just below said partition 37. In addition, the lower chamber 2d communicates through a lateral orifice 2f of the first control tube 2 with the outer atmosphere. As mentioned previously, the upper chamber 2c of the upper end part of the first control tube 2 may be connected alternately to a source of compressed air or to the outer atmosphere through a connection orifice 20 provided in the wall of said tube 2 at the upper end thereof.

Thanks to the particularities construction which has just been described, the reciprocating movements of the doser piston 28 in its upward and downward strokes are effected without producing notable suction or overpressures in the dosing chamber 26, the admission flap 32a acting automatically as an exhaust flap valve if, for some reason, the delivery pressure applied to the dosed quantity of the product by the doser piston 28 exceeds a predetermined value. In addition, as the closure of the admission valve is effected by means of the second control tube 35 at the end of ascending or suction stroke and before the beginning of the descending or delivery stroke, dosage of the product is made with a very high precision. Furthermore, the supply of the product under a certain pressure ensures complete filling of the dosing chamber 26 with the product without the appearance of a notable suction during the ascending stroke of the doser piston 28 to the open admission valve 32.

The second enclosure 24 defines a dispensing chamber 24b connected to the outlet opening 23 of the dosing chamber 26 and contains an ejection valve 40 whose obturation member 40a such as a flap is borne by the closed lower end of a third control tube 42 which is of a construction similar to that of the first control tube 2. The section 42a of the third control tube 42 penetrates in the dispensing chamber 24b of the second enclosure 24, is surrounded by a third bellows 43 of which one end 43a is fixed on the upper enclosure wall 24a traversed by the third control tube 42 and whose other end 43b is fixed tightly on the obturation member 40a or on the third tube 42 more or less close to the obturation member 40a as a function of the opening stroke of the latter and of the length of the section of the third tube 42. Each bellows fold is associated with a rigidifying washer disposed inside the third bellows 43 and surrounding said third tube 42 so as to be able to slide therealong during the movements of extension or of compression of said bellows 43. The annular space 44 between the third tube 42 and the bellows 43 is permanently connected to the outer atmosphere in the manner described previously.

The end of the third control tube 42 opposite the ejection valve 40 and always located outside the dispensing chamber 24b bears the control piston 45a of a single-acting jack 45 whose return spring 45b acts on said piston 45a and thus on the third control tube 42 in the sense either of closing the ejection valve 40 (as shown in the drawing), or in the sense of opening the latter (not shown). The piston 45a separates the volume of the jack 45 into two chambers 45c and 45d of which the one containing the spring 45b is permanently connected to the atmosphere and of which the other is capable of being alternately connected either to the outside atmosphere or to a source of compressed air (not shown). It should be noted that the return spring 45b, instead of being disposed in the upper chamber 45c of the jack 45 as shown in the drawing, may also be disposed in the lower chamber 45d, or more generally, in the chamber traversed by the third control tube 42 and may surround the latter. As in this case, the chamber containing the spring 45b is connected to atmosphere, the annular space 44 between this tube 42 and the third bellows 43 may directly communicate with said chamber. In that case, rapid closure of the valve 40 will be controlled by the pressure of compressed air establishing in the other chamber (here upper chamber 45c) against the pressure of the spring 45b.

The seat 40b of the ejection valve 40 is constituted, in the example shown, by the upper end of one or more fixed ejection pipes 46 at out in the dispensing chamber 24b, the flap 40a of said valve 40 opening in the direction opposite the direction of flow of the product through the ejection pipes 46. The dispensing part 20b of the doser-dispenser 20 is connected by a connecting conduit 47 to the outlet 23 of the dosing chamber 26 of the dosing part 20a of said doser-dispenser 20. The ejection pipes 46 are located above the preferably horizontal path of the recipients 101 which were previously made in known manner by thermoforming a thermoplastic web and each of which must be filled with a dosed quantity of a product 102 with the aid of the ejection pipes 46 of the doser-dispenser 20.

At least every nth recipient 102 or nth group of several recipients, for example of 2, 3, 4, 6 or 8 recipients, is weighed after having been filled with the dosed quantity of product 102. The whole number n is advantageously chosen from the numbers between 1 and 1000. Weighing means 103 are used, which, for more convenient representation, have been indicated in the drawing in the vicinity of the ejection pipes, but which, in reality, are provided at the outlet of a so called cut-out station at which the recipients thermoplastic web in a thermoplastic web, filled with a product and closed by a second, cover web sealed on the recipients in a packing installation, are "cut out" or separated from the thermoplastic web and the cover web. The separation can be carried out either individually or in groups of several recipients. In fact, the filled and sealed recipient(s) are preferably weighed when cut out from the thermoplastic web and the cover web. To that end, the weighing means 103 comprises a support 104 such as a tray on which rests the bottom of at least one filled recipient 101 or guiding rails on which rests the edge of at least one filled recipient 101. This support 104 is mounted at the end of one (105) of the arms 105, 106 of a double lever 107 borne in its central part by a pivot bearing 108. The other arm 106 of the double lever 107 comprises two branches 106a, 106b of which branch, 106a, is aligned with the first arm 105 and bears a cursor 109 which makes it possible to calibrate the weighing means 106 to a predetermined standard value for the weight of the dosed product 102 contained in the recipient 101. The other branch 106b of the second arm 106 of the double lever 107 comprises at its free end a rubbing contact 110 permanently applied against a central terminal 111 and capable of being applied against one (112) or the other (113) of two other terminals 112, 113 depending on the direction of pivotting of the double lever 107. The two terminals 112, 113 are located on either side of and at equal distances from the central terminal 111 in the vicinity of and at equal distances from corresponding ends of the curved rubbing contact 110 when the latter occupies the a median position corresponding to a zero difference between the measured weight and the standard weight. Of course, the double lever 107 comprises a blocking mechanism (not shown) which enables the weighing means 103 to occupy a neutral position during periods without weighing. In addition, the rubbing contact 110 is electrically insulated from the double lever 107.

Each of the terminals 111, 112, 113 is connected to a corresponding terminal 114, 115, 116 of a step-by-step motor 117 with two directions of step-by-step rotation. The terminals 111, 112, 114, 115 form part of a first supply circuit which, when it is closed by the rubbing contact 110, provokes the step-by-step rotation of the motor 117 in a first direction, for example in clockwise direction, and terminals 111, 113, 114, 116 form part of a second supply circuit which, when it is closed, provokes rotation of the step-by-step motor 117 in a second direction opposite said first direction of rotation i.e. counter clockwise. Of course, the weighing means 103 and the mode of controlling the step-by-step motor 117 may be replaced by equivalent means provided that they arrive at the same results or similar results.

The step-by-step motor 117 is mounted on the upper end of the first control jack 34, for example via a guiding unit 118 fixed on the cylindrical housing 34b of said jack 34 and coaxially thereto so as to constitute the upper transverse wall of said jack 34. This guiding unit 118 comprises a channel 118a by which the upper chamber of the jack 34 may be connected either to a source of compressed air, or to atmosphere. A coaxial bore 118b completely traverses the guiding unit 118 and receives in its lower part an upper end-of-stroke stop 119 which is guided axially in said bore 118b and is adjustable along the axis of the jack 34. The stop 119 penetrates more or less deeply in the upper chamber of the jack 34 and determines the upper position of the piston 34c of the jack 34 and that of the doser piston 28. The adjustable end-of-stroke stop 119 is controlled, as regards its axial displacement, by a spindle and nut transmission 120 of which the nut 120a is fast with the adjustable stop 119 and is guided axially in the bore 118b while the threaded spindle 120b cooperates with the threads of the nut 120a and, at its upper end, is fast with the driven shaft 115e of the step-by-step motor 117 whose housing 117b is mounted on the upper end of the guiding unit 118.

The second end-of-stroke stop 121 which limits the descending stroke of the doser piston 28 is, for example, fixed presents an annular form and is provided in the lower chamber, on the bottom wall of the first control jack 34. The bottom of this control jack 34 is advantageously constituted by the upper face of an intermediate annular dispensing disc 122 traversed tightly by the rod 34a of jack 34 and fixed on the lower cylinder end 34b of the latter. This dispensing disc 122 has two channels 122a, 122b of which the upper channel 122a opens out in the lower chamber of the pneumatic double-acting jack 34 and ensures connection of this lower chamber either with atmosphere or with a source of compressed air. The lower face of the dispensing disc 122 defines the upper end of a liquid damper 123 mounted at its lower end. On a lower dispensing disc 124 which is also traversed coaxially and tightly by rod 34a of the first control jack 34. In the cylindrical enclosure of the liquid damper 123 there tightly slides a damper shoe or piston 123a fixed on the rod 34a of the jack 34 so as to be able to accompany the doser piston 28 in its ascending and descending strokes, whilst opposing the sudden movements provoked alternately by the pneumatic pressure in the chambers of the first control jack 34. The damper shoe 123a separates the cylindrical enclosure of the damper 123 into an upper chamber and a lower chamber. In the upper chamber 123b of the damper 123 the lower passage channel 122b of the intermediate dispensing disc 122 opens and in the lower chamber 123c of said damper 123 a passage channel 124a in the lower dispensing disc 124 opens, the two chambers 123b, 123c of the damper 123 being permanently completely filled with a liquid. The two passage channels 122b and 124a open into the chambers 123b, 123c on either side of the damper shoe 123a in the enclosure of the damper 123. Chambers 123b, 123c which are connected, on the one hand, to each other with the aid of a connecting conduit 123d provided with a flow regulator 123e and, on the other hand, to a liquid reservoir containing a liquid such as oil whose outlet is generally obturated by an appropriate valve. The damper 123 and the flow regulator 123e make it possible to obtain for each type of product a very great regularity of the ascending and descending movements of the doser piston 28.

In addition, it is advantageous that the section 2b of the first control tube 2 moving outside the enclosure 3 or the lower section of the rod 34a of the first control jack 34, moving outside the latter and the damper 123, or the connection flange 134 between the lower end of said rod 34a and the upper end of the first control tube 2, be provided with a follower dog 125 extending laterally outwards, i.e. perpendicularly to the axis of the tube 2 and to the rod 34a coaxial to tube 2. The follower dog 125 is associated with a first detector 126 and, if necessary, also with a second detector 127, these two detectors 126 and 127 being for example proximity detectors or photoelectric cells. The location of the first detector 126 is chosen with respect to the follower dog 125 so that, when the latter is aligned with said first detector 126, the doser piston 28 occupies its descending end-ofstroke position, whilst the location of the second detector 127, when it is used, is chosen with respect to the follower dog 125 so that the latter is aligned with the second detector 127 when the doser piston 28 occupies its ascending end-of-stroke position. The first detector 126 is designed and arranged so that, on detecting the presence of the follower dog 125, it simultaneously controls the closure of the flap 40a of the ejection valve 40 and the opening of the flap 32a of the admission valve 32 as well as triggering the ascending stroke of the doser piston 28, i.e. the suction stroke thereof. The second detector 127 is, on the other hand, designed and arranged so that, on detecting the presence of the follower dog 125, it simultaneously controls the opening of the flap 40a of the ejection valve 40 and the closure of flap 32a of the admission valve 32, as well as the triggering of the descending stroke of the doser piston 28, i.e. the stroke for delivery of the dosed product to a recipient 101.

At least one of the two detectors 126, 127 may be adjustable at least parallel to the vertical axis of the first control tube 2. In this case, the detector 126 is shown adjustable and is borne by a spindle and nut transmission 128 whose nut 128a is fast with the detector or and is guided axially so as to remain immobile in rotation, and whose threaded spindle 128b cooperates with the threads of the nut 128a and is keyed on the driven shaft 129a of a step-by-step motor 129 whose housing 129b is fixed on the frame 100 of the doser-dispenser.

The length of the strokes of the doser piston 28 may also be adjusted with the aid of at least one of the two detectors 126, 127 and that the weight of the product dispensed in the recipients 101 may thus be corrected by remote control. The length of the stroke of the doser piston 28 will generally be adjusted only at one of the ends of stroke, the other end being considered as a fixed end, but, when a considerable difference suddenly appears between the measured weight of a dose of product and the predetermined standard weight, the length of the stroke of the doser piston 28 may be adjusted by acting on the two ends of stroke, i.e. on the two detectors or on one detector such as 126 and the adjustable stop 119.

In certain cases, it may therefore be advantageous if at least one of the step-by-step motors 129 associated with one of the adjustable-position detectors 126, 127, is capable of being controlled as a function of the difference between the measured weight of a filled recipient 101 and the predetermined standard weight, as is the case of the step-by-step motor 117 associated with the end-of-stroke stop 119.

The process for adjusting the dosed quantity of the product 102 dispensed in a recipient 101 will be readily understood from the preceding description of the adjusting device. It should be noted that the adjustment of the length of stroke of the doser piston 28 is preferably effected at the upper end of the stroke and that, if this adjustment is effected by remote control without interrupting the operation of the doser dispenser 20 and at the very location of said doser-dispenser, the weighing of the filled and sealed recipients may be effected outside the normal path of these recipients along a packing installation. However, it is advantageous to proceed with weighing the filled recipients and with comparing the weight of these latter with the standard weight on the very path of these recipients still inside the packing installation when the weighings are very frequent or concern each recipient passing beneath a doser-dispenser 20. To return to zero the difference existing between the measured weight of a recipient or of a group of recipients and the corresponding standard weight, one may act manually on the step-by-step motor of the adjustable-position stop or of an adjustable-position detector, but it is preferable that the control of said step-by-step motor be effected automatically from the weighing means and from the unit with control circuits associated with this motor.

Instead of adjusting the length of stroke of the doser-piston 28 with the aid of an upper adjustable stop, said stroke may also be adjusted with the aid of a lower adjustable stop. In that case, the upper stop is fixed and the lower stop is adjustable via a step-by-step motor.

The use as adjustable stop of the descending end-of-stroke detector 126 is particularly advantageous when it is a question of simultaneously dosing the quantity of product intended for a group of recipients and dispensed simultaneously by the assembly of the dosers associated respectively with the recipients of this group of recipients. In that case, one sole end-of-stroke detector may be used to determine the lower position of all the pistons of the group of dosers associated with a group of recipients whose weight of product is then determined overall for a group of recipients.

Of course, the different embodiments described hereinbefore may be subjected to a certain number of modifications without departing from the scope of the invention defined by the accompanying claims.

What is claimed:

1. A process for adjusting the quantities of a liquid or pasty product dosed and dispensed by doser-dispensers, incorporated in an installation for packing dosed product in recipients made by thermoforming a thermoplastic web that are advanced with respect to said doser-dispensers, the doser-dispensers being arranged in a row extending above the thermoplastic web and transversely with respect to the direction of advance of said web containing successive transverse rows of recipients parallel to the doser-dispensers, the recipients advancing step by step with said web in the direction of advance thereof, each doser-dispenser being of the type comprising:

a first cylinder enclosure having an upper chamber, a lower dosing chamber, a doser piston and an admission valve, said upper chamber having a supply conduit for the product to be dosed, said dosing chamber having an outlet, said doser piston sliding tightly in said first enclosure and separating said upper chamber from said dosing chamber, the doser piston having a central passage which constitutes an admission valve seat in said upper chamber, said admission valve movably mounted to open and close said central passage, said doser piston being movable in said first enclosure between an ascending end-of-stroke position corresponding to an upper position of the doser piston and a descending end-of-stroke position corresponding to a lower position of the doser piston, at least one of the end-of-stroke positions being adjustable, a first control tube, and a first control jack having a first piston, a first cylinder and a rod, said first control tube penetrating tightly in said first enclosure and being fixed in said first enclosure in said doser piston and outside said first enclosure to said rod and said piston of said jack, said cylinder of the first control jack being mounted on the first enclosure, a second control tube, and a second control jack having a second piston slidably mounted in said first control tube, said second control tube having a lower end and an upper end, said lower end penetrating tightly in said first enclosure, being fixed to said admission valve and being guided in said first control tube, said upper end being fast with said second piston of the second control jack, said second control jack being formed in said first control tube, a dispenser chamber, and an ejection valve having a flap and at least one ejection pipe, said dispensing chamber being connected to said outlet of the dosing chamber and to said at least one ejection pipe, said flap of the ejection valve being adapted to obturate said at least one ejection pipe and means for controlling said first jack, said second jack and said ejection valve such that when said doser piston moves during an ascending stroke, said ejection valve is closed and said admission valve is open to transfer the product from the upper chamber to the dosing chamber and when said doser piston moves during a descending stroke, said admission valve is closed and said ejection valve is open to transfer a determined quantity of product in the dosing chamber to the ejection pipe while simultaneously admitting another quantity of product into said upper chamber, said process comprising the following steps:

providing a standard value for the weight of at least one recipient filled with the product, and providing a limit value;

measuring the actual weight of at least every nth one of the recipients filled by the same doser-dispenser with a dosed quantity of the product, the number n being an integer between 1 and 1000, comparing said actual weight measured with said standard value, and adjusting said at least one end-of-stroke position of the doser piston to increase or decrease the stroke of said doser piston when the difference between the actual weight measured and the standard value exceeds said limit value and, effecting said adjusting, step by step, during operation of the doser-dispenser until said difference disappears.

2. A process according to claim 1, wherein said standard value represents the weight of a group of several recipients, the actual weight of said group of several recipients filled with the product being measured simultaneously and periodically, and wherein the stroke of the doser piston is adjusted step by step during operation of the doser-dispenser until the actual weight measured corresponds to said standard value for the weight of the group of several recipients.

3. A process according to claim 1, wherein the weight of the quantity of product dosed and dispensed in a recipient is adjusted, on the one hand, by adjusting the upper position of the doser piston corresponding to the ascending end-of-stroke thereof, by an adjustable stop driven by a step by step motor and serving as an ascending end-of-stroke stop for the doser piston fast with the piston of the first control jack via the first control tube, and, on the other hand, by associating with the lower position corresponding to the descending end-of-stroke of the doser piston, a fixed end-of-stroke stop capable of cooperating either with the piston of the first control jack or a member fast with a section of the first control tube, permanently located outside the enclosure and the first control jack.

4. A process according to claim 1, wherein the weight of the quantity dosed and dispensed in a recipient is adjusted, on the one hand, by adjusting the lower position corresponding to the descending end-of-stroke of the doser piston by an adjustable stop driven by a step by step motor and capable of cooperating with the piston of the first control jack or with a member fast with said piston and serving as a descending end-of-stroke stop of said doser piston fast with the piston of the first control jack via the first control tube and the rod and, on the other hand, by associating with the corresponding upper position of the ascending end-of-stroke of the doser piston, a fixed end-of-stroke stop capable of cooperating with said piston of the first control jack, either with a member fast with the first control tube or the rod of the first control jack.

5. A process according to claim 1, wherein an end-of-stroke detector is used as a descending end-of-stroke stop of the doser piston which simultaneously triggers closure of the flap of the ejection valve and opening of the flap of the admission valve and the ascending stroke of the doser piston.

6. A process according to claim 1, wherein there is associated with the descending end-of-stroke stop of the doser piston an end-of-stroke detector which simultaneously triggers closure of the flap of the ejection valve and opening of the flap of the admission valve as well as the ascending stroke of the doser piston.

7. A device for adjusting the quantity of a liquid or pasty product dosed and dispensed by a doser-dispenser comprising:

a first cylinder enclosure having an upper chamber, a lower dosing chamber, a doser piston and an admission valve, said upper chamber having a supply conduit for a product, said dosing chamber having an outlet, said doser piston sliding tightly in said first enclosure and separating said upper chamber from said dosing chamber, the doser piston having a central passage which forms an admission valve seat in said upper chamber, said admission valve movably mounted to open and close said central passage, said doser piston being movable in said first enclosure between an ascending end-of-stroke position corresponding to an upper position of the doser piston and a descending end-of-stroke position corresponding to a lower position of the doser piston, the position of at least one of the end-of-stroke positions being adjustable, a first control tube and a first control jack having a first piston, a first cylinder and a rod, said first control tube penetrating tightly in said first enclosure and being fixed therein to said doser piston, said first control tube having a section movable outside said enclosure which is connected to said piston of said first control jack through said rod, said cylinder of the first control jack being fixedly mounted with respect to the first enclosure, a second control tube and second control jack having a second piston slidably mounted in said first control tube, said second control tube having a lower end part and an upper end, said lower end part penetrating tightly in said first enclosure, being fixed to said admission valve and being guided in said first control tube, said upper end being fast with said second piston of the second control jack, said second control jack being formed in said first control tube, a dispensing chamber and an ejection valve having a flap and at least one ejection pipe, said dispensing chamber being connected to said outlet of the dosing chamber and to said at least one ejection pipe, said flap of the ejection valve selectively obturating said at least one ejection pipe, and means for controlling said first jack, said second jack and said ejection valve such that when said doser piston moves during an ascending stroke, said ejection valve is closed and said admission valve is open to transfer the product from the upper chamber to the dosing chamber and when said doser piston moves during a descending stroke, said admission valve is closed and said ejection valve is open to transfer a determined quantity of product in the dosing chamber to the ejection pipe while simultaneously admitting a quantity of product into said upper chamber, and two end-of-stroke stops positioned on said first jack to determined respective ends of stroke of the doser piston, at least one of said stops being adjustable during operation of the doser-dispenser as a function of any difference existing between the measured weight of a dosed and dispensed quantity of product and a predetermined standard weight.

8. A device according to claim 7, wherein the adjustable end-of-stroke stop penetrates partially in the upper chamber of the first control jack for limiting the ascending stroke of said first piston of said first jack and of the doser piston, and the device further comprises a step by step motor having a driven shaft and a housing, said driven shaft having two directions of rotation and being connected by a spindle and nut transmission to said adjustable stop, said housing being fixed relative to the doser dispenser, the rotation of the driven shaft of said step by step motor being controlled as a function of a positive or negative difference between the measured weight of the quantity of product dosed and dispensed in a recipient, and the predetermined standard weight.

9. A device according to claim 8, further comprising weighing means for weighing at least one filled recipient, a calibration mechanism for predetermining the standard weight, a comparison unit for comparing the weight measured by the weighing means and the standard weight predetermined by the calibration mechanism, and a unit with control circuits acting on the step by step motor of the adjustable stop as a function of signals issued from the comparison unit, in the sense of reducing any difference between the measured weight of a filled recipient and the predetermined standard weight.

10. A device according to claim 8, wherein the adjustable stop is axially guided in a guiding unit mounted on the upper end of said first jack and having an axial bore, said adjustable stop being positioned for cooperating with said first piston of the first jack by limiting the ascending stroke of said first piston, and a spindle and nut transmission, connecting said first piston and said step by step motor, said spindle and nut transmission including a nut fixed to said adjustable stop, said nut being guided axially and immobile in rotation in the axial bore of the guiding unit, and a spindle treadably engaged with said nut and fast with the driven shaft of the step by step motor, said motor being mounted on an upper end of the first control jack.

11. A device according to claim 8, wherein the other end-of-stroke stop limits the descending stroke of the doser piston and is fixed, said other end-of-stroke stop being disposed on the first control jack near a lower end thereof.

12. A device according to claim 7, wherein the section of the first control tube movable outside the enclosure is provided with a lateral follower dog associated with a first detector whose position corresponds to the descending end-of-stroke position of said follower dog, simultaneously controls closure of the flap of the ejection valve and opening of the flap of the admission valve as well as triggering the ascending stroke of the doser piston.

13. A device according to claim 7, wherein the rod of the first control jack includes a section movable outside the first control jack and outside a damper thereof, said section being provided with a lateral follower dog associated with a first detector whose position corresponds to the descending end-of-stroke position of the doser piston and which, on detecting the presence of said follower dog, simultaneously controls closure of the flap of the ejection valve and opening of the flap of the admission valve as well as triggering the ascending stroke of the doser piston.

14. A device according to claim 7, comprising a connection flange between a lower end of the rod of the first control jack and the upper end of the first control tube, said connection flange being provided with a lateral follower dog associated with a first detector whose position corresponds to the descending end-of-stroke position of the doser piston and which, on detecting the presence of said follower dog, simultaneously controls closure of the flap of the ejection valve and opening of the flap of the admission valve as well s triggering the ascending stroke of the doser piston.

15. A device according to claim 7, wherein a section of the first control tube moves outside the enclosure and is provided with a lateral follower dog associated with a detector whose position of the doser piston and which, on detecting the presence of said follower dog, simultaneously controls opening of the flap of the ejection valve and closure of the flap of the admission valve as well as triggering the descending stroke of the doser piston.

16. A device according to claim 15, comprising a step by step motor having a driven shaft and a housing associated with said detector, said detector being adjustably supported by a spindle and nut transmission, the nut of which is fast with the detector and is guided axially to be immobile in rotation while the spindle thereof is connected to the driven shaft of the step by step motor, said step by step motor being fixed on the doser dispenser.

17. A device according to claim 16, wherein the step by step motor associated with said detector is controlled as a function of the difference between the measured weight of a filled recipient and the predetermined standard weight.

18. A device according to claim 7, wherein a section of the rod moving outside the first control jack is provided with a lateral follower dog associated with a detector whose position corresponds to the ascending end-of-stroke position of the doser piston and which, on detecting the presence of said follower dog, simultaneously controls opening of the flap of the ejection valve and closure of the flap of the admission valve as well as triggering the descending stroke of the doser piston.

19. A device according to claim 18, comprising a step by step motor having a driven shaft and a housing associated with said detector, said detector being adjustably supported by a spindle and nut transmission, the nut of which is fast with the detector and is guided axially to be immobile in rotation while the spindle thereof is connected to the driven shaft of the step by step motor, said step by step motor being fixed on the doser dispenser.

20. A device according to claim 19, wherein the step by step motor associated with said detector is controlled as a function of the difference between the measured weight of a filled recipient and the predetermined standard weight.

21. A device according to claim 7, comprising a connection flange between a lower end of the rod of the first jack and the upper end of the first control tube, said connection flange being provided with a lateral follower dog associated with a detector whose position corresponds to the ascending end-of-stroke position of the doser piston and which, on detecting the presence of said follower dog, simultaneously controls opening of the flap of the ejection valve and closure of the flap of the admission valve as well as triggering the descending stroke of the doser piston.

22. A device according to claim 21, comprising a step by step motor having a driven shaft and a housing associated with said detector, said detector being adjustably supported by a spindle and nut transmission, the nut of which is fast with the detector and is guided axially to be immobile in rotation while the spindle thereof is connected to the driven shaft of the step by step motor, said step by step motor being fixed on the doser dispenser.

23. A device according to claim 22, wherein the step by step motor associated with said detector is controlled as a function of the difference between the measured weight of a filled recipient and the predetermined standard weight.

24. A device according to claim 7, wherein the first control jack is a pneumatic double acting jack whose control rod bears a damping shoe sliding tightly in a an enclosure of a liquid damper having two chambers which are completely filled with a liquid and which communicate with one another via a connecting conduit provided with a flow regulator.

* * * * *